United States Patent
Hwang et al.

(10) Patent No.: US 11,438,774 B2
(45) Date of Patent: Sep. 6, 2022

(54) DEVICE AND METHOD FOR CSI PROCESSING BASED ON MULTI-SERVICE PRIORITY QUEUE

(71) Applicant: Intel IP Corporation, Santa Clara, CA (US)

(72) Inventors: Yeong-Sun Hwang, By (DE); Ziyang Ju, Munich (DE); Anchit Malhotra, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 16/499,975

(22) PCT Filed: May 11, 2017

(86) PCT No.: PCT/US2017/032110
§ 371 (c)(1),
(2) Date: Oct. 1, 2019

(87) PCT Pub. No.: WO2018/208302
PCT Pub. Date: Nov. 15, 2018

(65) Prior Publication Data
US 2021/0282034 A1 Sep. 9, 2021

(51) Int. Cl.
*H04W 24/08* (2009.01)
*H04L 1/00* (2006.01)
*H04W 8/18* (2009.01)

(52) U.S. Cl.
CPC .......... *H04W 24/08* (2013.01); *H04L 1/0026* (2013.01); *H04W 8/183* (2013.01)

(58) Field of Classification Search
CPC .... H04W 24/08; H04W 8/183; H04L 1/0026; H04L 1/0027; H04L 1/0036
See application file for complete search history.

(56) References Cited

U.S. PATENT DOCUMENTS 6,895,408 B1 * 5/2005 Kavantzas .............. G06F 9/541
2014/0078919 A1 * 3/2014 Hammarwall ........ H04L 1/0026
370/252

(Continued)

FOREIGN PATENT DOCUMENTS

| EP | 2880777 A1 | 6/2015 |
| EP | 2894920 A1 | 7/2015 |
| WO | WO-2013/169197 A1 | 11/2013 |

OTHER PUBLICATIONS

Intel Corporation, "Relaxation of CSI Calculation Complexity for eCA", 3 pgs., Nov. 15, 2015, retrieved from: URL: http://www.3gpp.org/ftp/Meetings_3GPP_SYNC/RAN1/Docs/.

(Continued)

*Primary Examiner* — Peter P Chau
(74) *Attorney, Agent, or Firm* — Banner & Witcoff Ltd.

(57) ABSTRACT

The disclosure relates to a mobile communication device circuitry, comprising: a radio receiver configured to receive a plurality of channel state information (CSI) measurement requests, each CSI measurement request triggering a CSI measurement; and a processor configured to process the plurality of CSI measurement triggers within a CSI reporting period according to a CSI computation scheduling which is based on a multi-service priority queue of multi-size jobs, each job corresponding to a respective CSI measurement trigger.

20 Claims, 6 Drawing Sheets

(56) References Cited

U.S. PATENT DOCUMENTS

| | | | |
|---|---|---|---|
| 2015/0263863 A1* | 9/2015 | Kalkunte | H04L 41/08 |
| | | | 370/252 |
| 2019/0229874 A1* | 7/2019 | Lee | H04L 5/005 |
| 2021/0282103 A1* | 9/2021 | Zhu | H04W 8/183 |

OTHER PUBLICATIONS

European Patent Office, PCT International Search Report issued for PCT/US2017/032110, 7 pgs., dated Feb. 5, 2018.

* cited by examiner

DEVICE AND METHOD FOR CSI PROCESSING BASED ON MULTI-SERVICE PRIORITY QUEUE

FIELD

The disclosure relates to a mobile communication device circuitry and a method for processing a plurality of channel state information (CSI) measurement triggers based on a multi-service priority queue of multi-size jobs. In particular, the disclosure addresses the challenge of supporting multiple asynchronous sets of CSI measurement triggers in a minimum CSI reporting period at a communication device, whose computation capacity can be "overloaded", i.e. the capacity is smaller than what is needed for the maximum possible number of CSI measurement triggers per the minimum CSI reporting period.

BACKGROUND

A wide range of communication systems 100, e.g. as shown in FIG. 1, employs link adaptation, whereby transmit signal 111, 121, 131 is modified based on CSI to enhance throughput performance. A CSI representation may comprise transmission parameters, or CSI elements, such as modulation and coding scheme (MCS), transmission rank, beam direction, and precoding matrix. CSI in some systems with reciprocal channels can be obtained at the transmitter, e.g. at the base stations 110, 120, 130 shown in FIG. 1, but in most systems the information needs to be measured at the receiver, e.g. at the mobile device 140 shown in FIG. 1, then fed back to the transmitter. This CSI measurement may be triggered via aperiodic (dynamic) request or periodic (static) scheduling from the transmitter.

A major and growing challenge in measuring the CSI at a receiver lies in reducing the associated computation cost in terms of hardware (HW) size, processing time, and/or power consumption of the device. This challenge has been an important design factor in mobile devices with stringent cost requirements. In particular, a typical design requirement for a receiver is to finish all triggered CSI measurements within a minimum CSI reporting period, so as to reuse its resources for the new measurement triggers in the next period.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
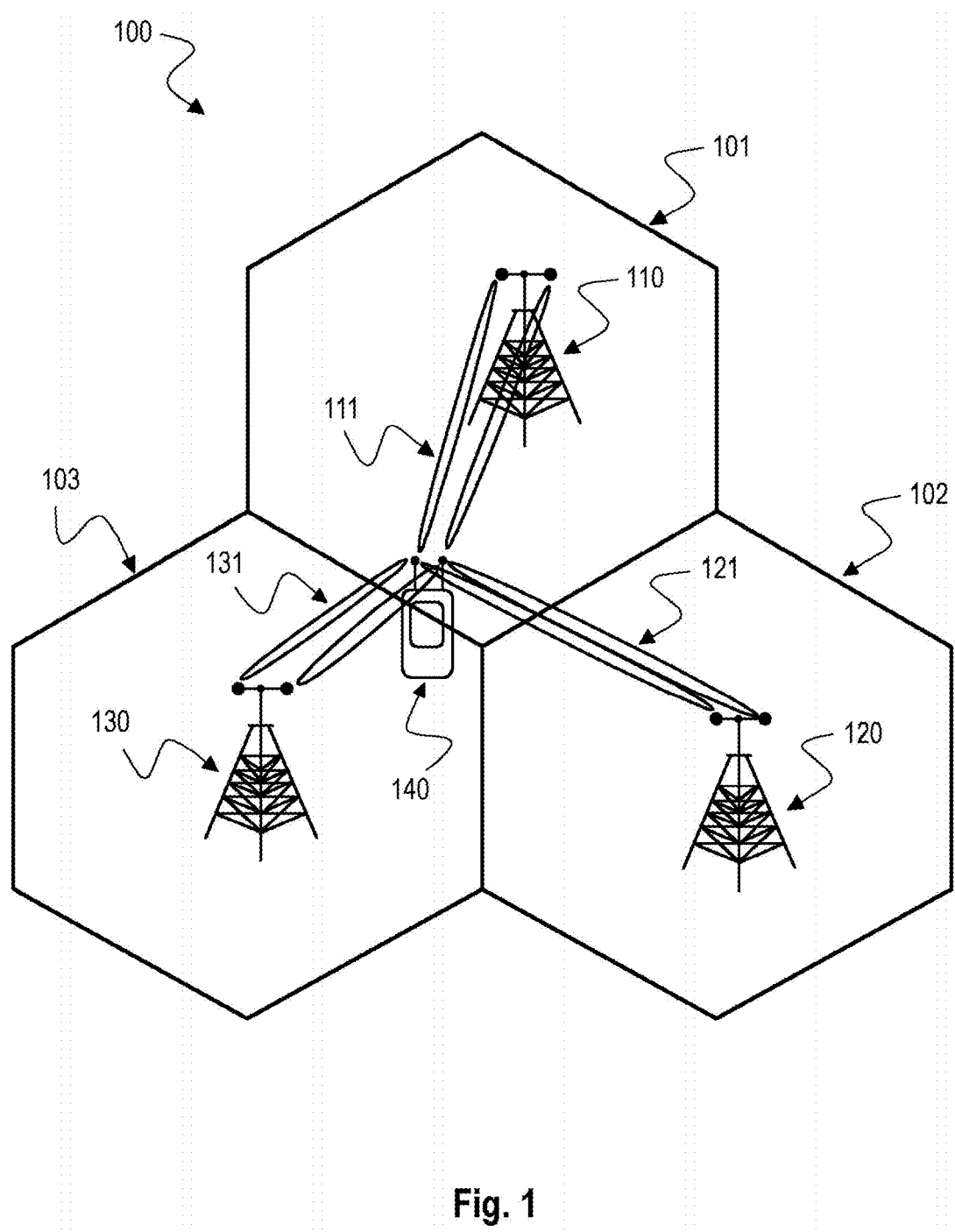
FIG. 1 is a schematic diagram illustrating a multiple-input multiple-output (MIMO) communication system 100 where a mobile terminal 140 has to process multiple CSI measurement triggers 111, 121, 131.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
3GPP: Third Generation Partnership Project
CSI: Channel State Information
TTL: Time-To-Live
FS: Full Service
PS: Partial Service
NS: No Service
SIM: Subscriber Identity Module
DSDA Dual-SIM Dual-Active
RM: Reporting Mode
RT: Reporting Type
CC: Component Carrier
CRI: CSI reference signal Resource Indicator
RI: Rank Indicator
PMI: Precoding Matrix Indicator
CQI: Channel Quality Indicator
MCS: Modulation and Coding Scheme
CoMP Coordinated Multipoint transmission
MIMO: Multiple-Input Multiple-Output
TM: Transmission Mode
LTE: Long Term Evolution
OFDM: Orthogonal Frequency Division Multiplexing
RF: Radio Frequency
eNodeB: Base Station
UE: User Equipment, Mobile Device The methods and devices described herein may be based on mobile communication devices configured to perform a large number of CSI measurements. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be configured to transmit and/or receive radio signals and performing associated signal processing. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The methods and devices described herein may be implemented in wireless communication networks, in particular communication networks based on mobile communication standards such as LTE, in particular 4.5G, 5G and beyond. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be based on CSI measurements and CSI measurement requests configured to trigger CSI measurements. In wireless communications, channel state information (CSI) refers to known channel properties of a communication link. CSI describes how a signal propagates from the transmitter to the receiver and represents the combined effect of, e.g., scattering, fading, and power decay with distance. The method is called channel estimation, a CSI measurement is a measurement for acquiring CSI. The CSI makes it possible to adapt transmissions to current channel conditions, which is crucial for achieving reliable communication with high data rates in MIMO systems, e.g. multi-antenna systems. CSI needs to be estimated at the receiver and usually quantized and fed back to the transmitter.

For convenience, two distinct CSI measurement triggers are called herein "coexisting" if the time difference between the two is shorter than the minimum CSI reporting period length. This cost constraint has been recognized in modern communication systems such as 3GPP (third generation partnership project) LTE (long-term evolution), where the maximum number of CSI "updates" $N_{max}^{CSIupdate}$, i.e. the CSIs that are actually computed, can be limited to a value smaller than the maximum possible number of coexisting CSI measurement triggers.

The methods and devices described hereinafter provide solutions for the challenge of efficient CSI measurement which takes even greater significance with newer generations of communication systems that support an ever larger number of aggregated carriers, larger bandwidth, coordinated multipoint transmission (CoMP), powerful beamforming with thousands of beam candidates such as 3D beamforming and massive MIMO (multiple-input multiple-output), and multiple independent connections such as multi-SIM (subscriber identity module). Such feature expansions can increase the computation cost of an individual CSI as well as the number of coexisting CSI measurement triggers, to the degree that (1) supporting even a reasonably limited $N_{max}^{CSIupdate}$ in one connection becomes impractical and (2) $N_{SIM}N_{max}^{CSIupdate}$ may have to be supported for $N_{SIM}$ active connections.

The methods and devices described hereinafter provide a class of CSI computation scheduling methods that can avoid computation capacity overloading in any scenario, including substantially costlier individual CSI types, massive number of coexisting CSI measurement triggers, and multiple independent connections, while inherently optimizing the support of dynamic set of triggers. These methods and devices enable a receiver to minimize its hardware while supporting richer feature sets with extensive CSI reporting.

The methods and devices described hereinafter are based on the following key principles:

A CSI computation scheduling may be modeled as a multi-service priority queue, whereby the CSI measurement triggers are modeled as multiclass multi-size jobs with limited time-to-live (TTL), and the jobs with higher priority are served first.

A job (CSI measurement trigger) may belong to one of three classes, where a first class may include both long-term (slowly-varying) and short-term (fast-varying) CSI elements, a second class may include only long-term elements, and a third class may include only short-term elements. Jobs can have different sizes, i.e. time needed to compute, since different triggers may belong to different transmission configurations (for example, bandwidth) and may comprise different CSI elements. A job has a time-to-live in the sense that its measurement has to be readied within a limited time.

A service (CSI computation) may belong to one of three types, where a first type of full service computes all triggered CSI elements, a second type of partial service computes only the triggered short-term elements, and a third type of no service does not compute any element.

Based on the above principles, a class of queue-based CSI computation scheduling methods can be constructed such that (1) a $N_{max}^{CSIupdate}$ that would nominally overload the computation capacity is still supported, (2) the number of CSI updates is adaptively maximized, and (3) all coexisting CSIs are treated fairly.

The class of queue-based CSI computation scheduling methods presented hereinafter offers the first known mechanisms for a receiver to support numbers of CSI updates that would nominally overload the computation capacity, while adaptively optimizing the actual number of CSI updates and fairly treating all CSI measurement triggers from any of multiple independent connections. Herein, "nominal overload" means that full computation of all triggered CSI elements from a given number of CSI updates exceeds the given CSI computation capacity.

The concept can be described by the following key features: 1) Multisize jobs with limited time-to-live in the context of priority queue model, for greater adaptive utilization of a given computation capacity as well as fairness among independent connections; and 2) Multiservice queueing of multiclass jobs, for supporting otherwise prohibitive computation cost of individual CSIs in the context of massive number of CSI measurement triggers.

The methods and devices described herein may be implemented in mobile devices that support carrier aggregation, CoMP as in e.g. LTE TM (transmission mode) 10 with multiple CSI processes, FD-MIMO (full dimension MIMO), massive MIMO, multi-SIM multi-Active, etc. The concept according to this disclosure allows development of communication modems with significantly reduced hardware (HW) size, processing time, and/or power consumption. The concept becomes especially valuable in system configurations with massive CSI sizes, massive number of coexisting CSIs, and multi-SIM multi-Active.

Figure 2:
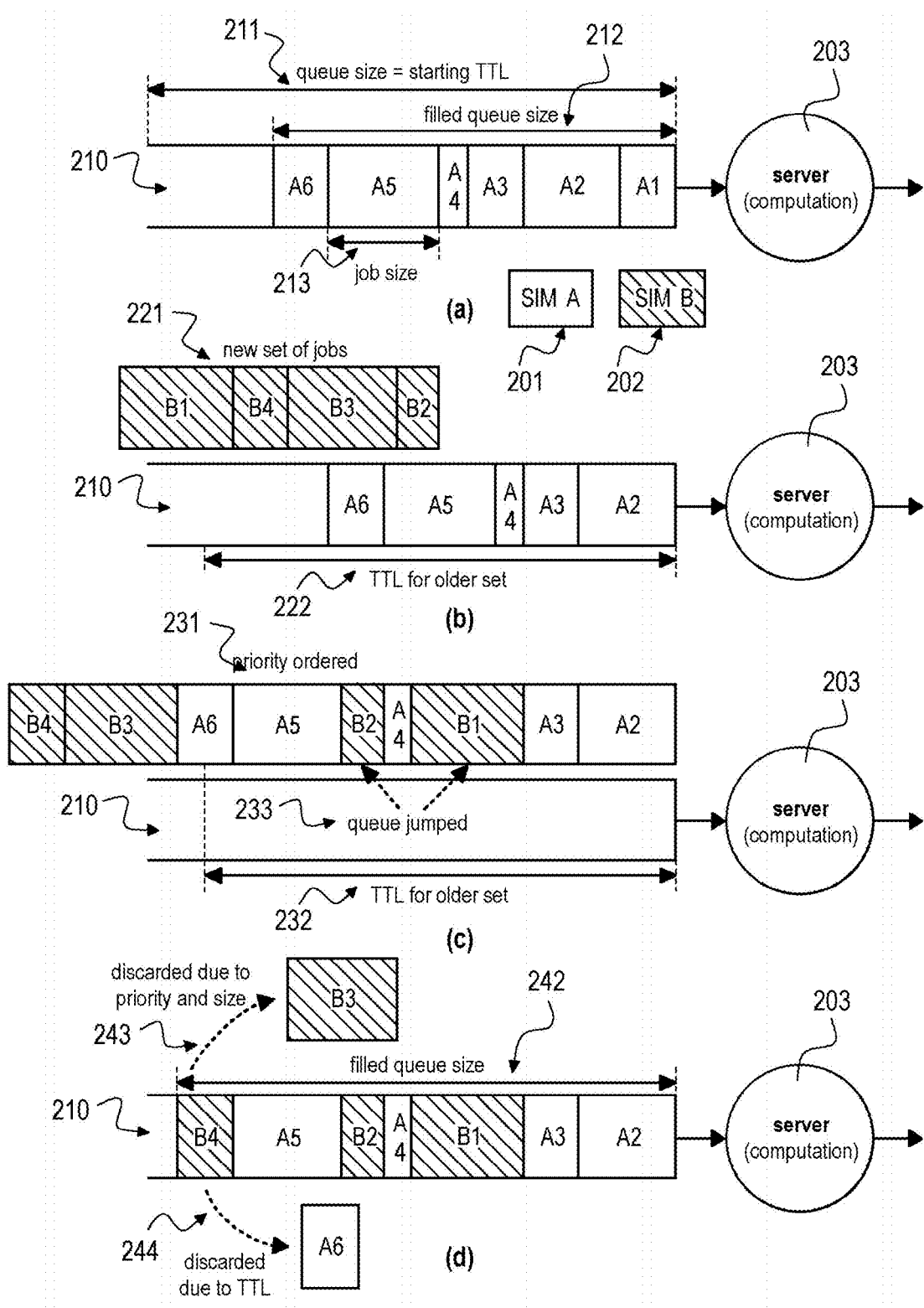
FIG. 2 is a schematic diagram illustrating an example priority queueing 200 of multi-size jobs with limited time-to-live (TTL) according to an exemplary implementation.

FIG. 2 is a schematic diagram illustrating an example priority queueing 200 of multi-size jobs with limited TTL according to an exemplary implementation.

The figure is an example illustration of the priority queue model used in this disclosure for CSI computation scheduling in multi-SIM scenarios. In the figure, each rectangle corresponds to a job, i.e. CSI measurement trigger. Rectangles A1, A2, A3, A4, A5 and A6 correspond to jobs from a first SIM (SIM A, 201), and dash-filled rectangles B1, B2, B3 and B4 correspond to jobs from a second SIM (SIM B, 202). The horizontal length of a rectangle represents the job size 213, i.e. the time needed to compute the job, and the length of the queue 210 represents the queue size 211, i.e. the CSI computation capacity, which is the same as the TTL of a new job and is typically smaller than the minimum CSI reporting period. The queue 210 is an input queue of a server 203 which is configured to compute the jobs after passing the queue 210.

The example consists of four subfigures in the logical order of events. Subfigure (a) shows the state of the queue 210 a little while ago when a set of first SIM jobs A1, A2, A3, A4, A5 and A6 has been already scheduled. Subfigures (b)-(d) show a CSI computation scheduling process after a set of second SIM jobs B1, B2, B3 and B4 just arrived, by which time the job A1 has been served and the TTL for the earlier set of jobs 222 has decreased. Since at least one job from each set can coexist in the queue 210, these two sets are "coexisting".

As subfigure (c) shows, the arrival of another set of jobs triggers sorting of all queued jobs and the new jobs 221 together with respect to a priority metric, implying that a new job with sufficiently high priority can jump the queue 233, shifting (or reordering) the earlier queued jobs with lower priorities to the back. Subfigure (d) shows the queue 210 now populated with the jobs in the order of priorities, whereby any job from either SIM with sufficiently low priority and/or too large to fit in the queue is discarded 243 from the queue 210, i.e. not computed, as the job B3 in this example. In addition, an earlier job, e.g. A6, that is to be reordered can actually be discarded 244 from the queue 210 even if its reordered position is still within the queue size 242, when the position exceeds the job's TTL that is now smaller than the queue size 242.

The priority metric used for sorting the jobs is a representation of the impact of the associated job instance on the performance. That is, it estimates the importance of updating the particular CSI. A variety of metrics may be used, including the time since the last update, channel parameters such as coherence time, time-variation of recent updated CSI values, and/or combinations of those.

As the figure suggests, considering the different computation times of the jobs allows greater adaptive utilization of the computation capacity over time, and incorporating the TTL concept enables a complete fairness among multiple asynchronous connections. One implied cost of the multisize job aspect is that the sizes need to be estimated, either online or offline.

Two generalizations of the above priority queueing model can provide the means to support demanding $N_{max}^{CSIupdate}$ requirements that would otherwise overwhelm the computation capacity. With expanded features of newer communication systems, the computation cost of a single CSI can be so large that fully updating just a few CSIs can exceed a well-budgeted computation capacity of a receiver. This may make it impractical to support even the minimum value in the range of $N_{max}^{CSIupdate}$ given by the system, which may still be a small fraction of the maximum possible number of coexisting CSI measurement triggers. One way to overcome such potential overload and support a $N_{max}^{CSIupdate}$ preferred by the system is to classify each constituent element of CSI—rank, beam, precoding matrix, MCS, etc.—according to the expected rate of time-variation of its impact on performance and to update fast-varying elements more often than slowly-varying elements. In other words, in many instances some of the triggered CSI elements are not computed but rather copied from previous estimates. In the framework of the above queue model, this translates to multiple classes of jobs and multiple types of services.

Multiple service types may be derived from the classification of CSI elements. A simple two-way classification may comprise slowly-varying (long-term) and fast-varying (short-term) elements. More diverse classifications can also be done, although herein we limit the discussion to the two-way example for succinct description of the core principles. This two-way element classification can lead to three service types—a full service (FS) where all triggered long-term and short-term elements are computed, partial service (PS) where all triggered short-term elements are computed, and no service (NS) where no elements are computed. Of course, other types of element classification can also be implemented. Often, a service where only the long-term elements are computed is not necessary, because the short-term elements are typically conditioned on the long-term elements, meaning an update of long-term elements should imply the update of all co-triggered short-term elements.

Multiple classes of jobs may be derived from the service classification. Based on the above example of three service types, three job classes may be constructed—a first class of jobs may be amenable to full, partial, or no computation, a second class may be amenable to full or no service only, and a third class may be amenable to partial or no service only. An example set of such three job classes comprises a first class that contains both long- and short-term elements, a second class that contains only long-term elements, and a third class that contains only short-term elements.

Figure 3:
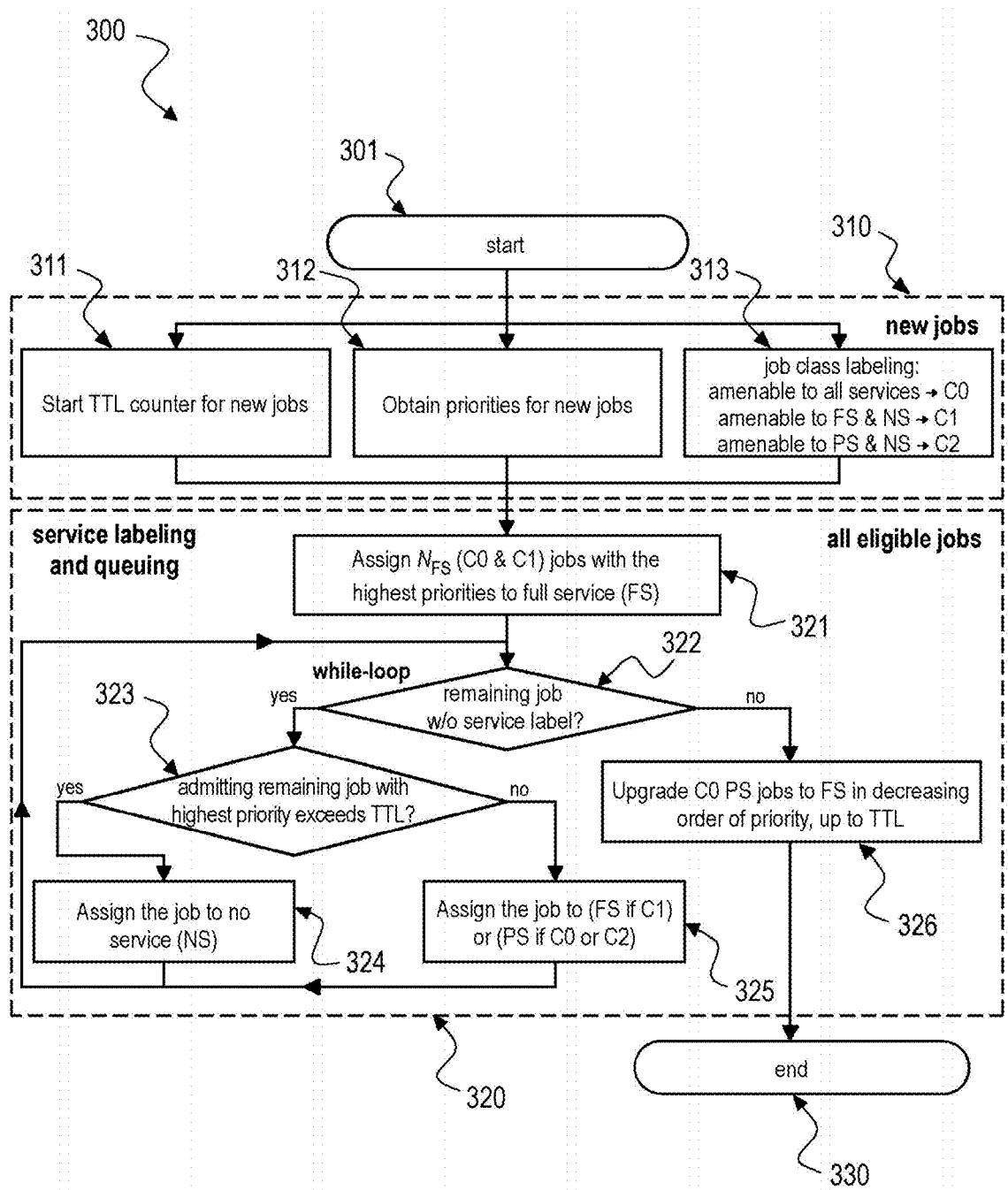
FIG. 3 is a flow diagram of an example CSI computation scheduling 300 according to an exemplary implementation.

FIG. 3 is a flow diagram of an example CSI computation scheduling 300 according to an exemplary implementation. The example CSI computation scheduling method 300 can be used to illustrate the concept of this disclosure. The queue may correspond to the queue 210 depicted in FIG. 2. The flow corresponds to one cycle of the CSI scheduling for one set of simultaneous CSI triggers from any one of the supported connections. That is, one flow from the start to the end runs for each new set of jobs, e.g. as illustrated above with respect to FIG. 2, and the actual service of the scheduled jobs starts after the flow comes to the end. This does not mean that the CSI computation starts only at the end of a scheduling; a service may be underway for some jobs in an earlier set while the scheduling runs for all new and queued jobs not under the service. In practice, a small number of queued jobs next in line to be served may have to be "locked" into the service and out of re-sorting and reordering upon the arrival of new jobs, to prevent unnecessary idling of the server while a scheduling takes place. Thus all new jobs and the unlocked queued jobs can be characterized together as "eligible" for sorting and reordering.

As the figure shows, the CSI computation scheduling flow may be described in the following stepwise fashion between start 301 and end 330, where it is assumed that the queue size can support at least $N_{FS}$ full service and at least $(N_{max}^{CSIupdate} - N_{FS})$ partial service.

1. New job preparation: For all new jobs 310, do the following in any order.
   a. Start TTL counter 311 for the new set of jobs. Only one counter for each set of simultaneous jobs is needed.
   b. Obtain priority metrics 312 for each new job.
   c. Label the job class 313. If the job is amenable to all services, its class is C0. Else if the job is amenable to full and no services only, its class is C1. Else if the job is amenable to partial and no services only, its class is C2.
2. Service labeling and queueing 320: For all eligible jobs, do the following in the prescribed order.
   a. Assign FS label 321 to up to $N_{FS}$ (C0 and C1 class) jobs with the highest priorities. Admit them to the queue. The controllable parameter $N_{FS} \geq 1$ is the minimum number of full service that the server would like to provide in a minimum CSI reporting period. If $N_{FS}=1$, TTL check is unnecessary. If $N_{FS}>1$, TTL check is necessary for all jobs except the very first one with the highest priority.
   b. While there is a remaining job 322 without service label:
      i. If admitting 323 the remaining job with the highest priority would exceed the TTL of the job, assign 324 NS label to the job. If the job belongs to C0 class, its PS size is used.
      ii. Else, assign 325 FS label to the job if it is C1 class, or assign 325 PS label to the job if it is C0 or C2 class. Admit it to the queue.
3. Sequentially reassign 326 the service label of the queued C0 jobs with PS label to FS label, in the decreasing order of priority, until (there is no more C0 job with PS label) or (the point when reassigning the next C0 job with PS label to FS label would cause a queued job to exceed its TTL), whichever comes earlier.

A job with NS label means its CSI elements are either copied from a previous estimate if available, or generated in a predetermined/random manner if such history is not available.

This example gives higher preference to maximizing the total number of fully or partially updated jobs rather than to maximizing the number of full updates while meeting the $N_{max}^{CSIupdate}$ target. The flow can be adapted to give preference to the latter as well.

The example CSI computation scheduling 300 described above can be represented as an algorithm or a method for scheduling computation of channel state information (CSI) based on a multi-service priority queue, as described in the following. Such a method 300 may include the following blocks: Receiving a new set of jobs 310, each job corresponding to a respective CSI measurement trigger; starting 311 a Time-To-Live (TTL) counter for the jobs from the new set of jobs; obtaining 312 a priority for each job from the new set of jobs; labeling 313 each job from the new set of jobs with a job class from a set of job classes; queueing the new set of jobs to the multi-service priority queue 320; labeling 320 each job from the queued jobs with a service type from a set of service types based on the priority and the job class of the respective job; and processing the queued jobs based on their service types.

The method 300 may include: reassigning 321 the service type labeling of the queued jobs based on their priority. The method 300 may include: updating the TTL counters of the queued jobs. The method 300 may include: discarding a job of the queued jobs from the queue based on the job's TTL counter and priority and based on a size of the multi-service priority queue. The set of service types may include the following service types: full service, partial service, and no service. The set of job classes comprises the following job classes: a first job class (C0) labeled for jobs amenable to all service types, a second job class (C1) amenable to services of full service type and services of no service type, a third job class (C2) amenable to services of partial service type and no service type. Processing the queued jobs may include: computing for a queued job a subset of CSI elements of a CSI measurement corresponding to the queued job.

Figure 4:
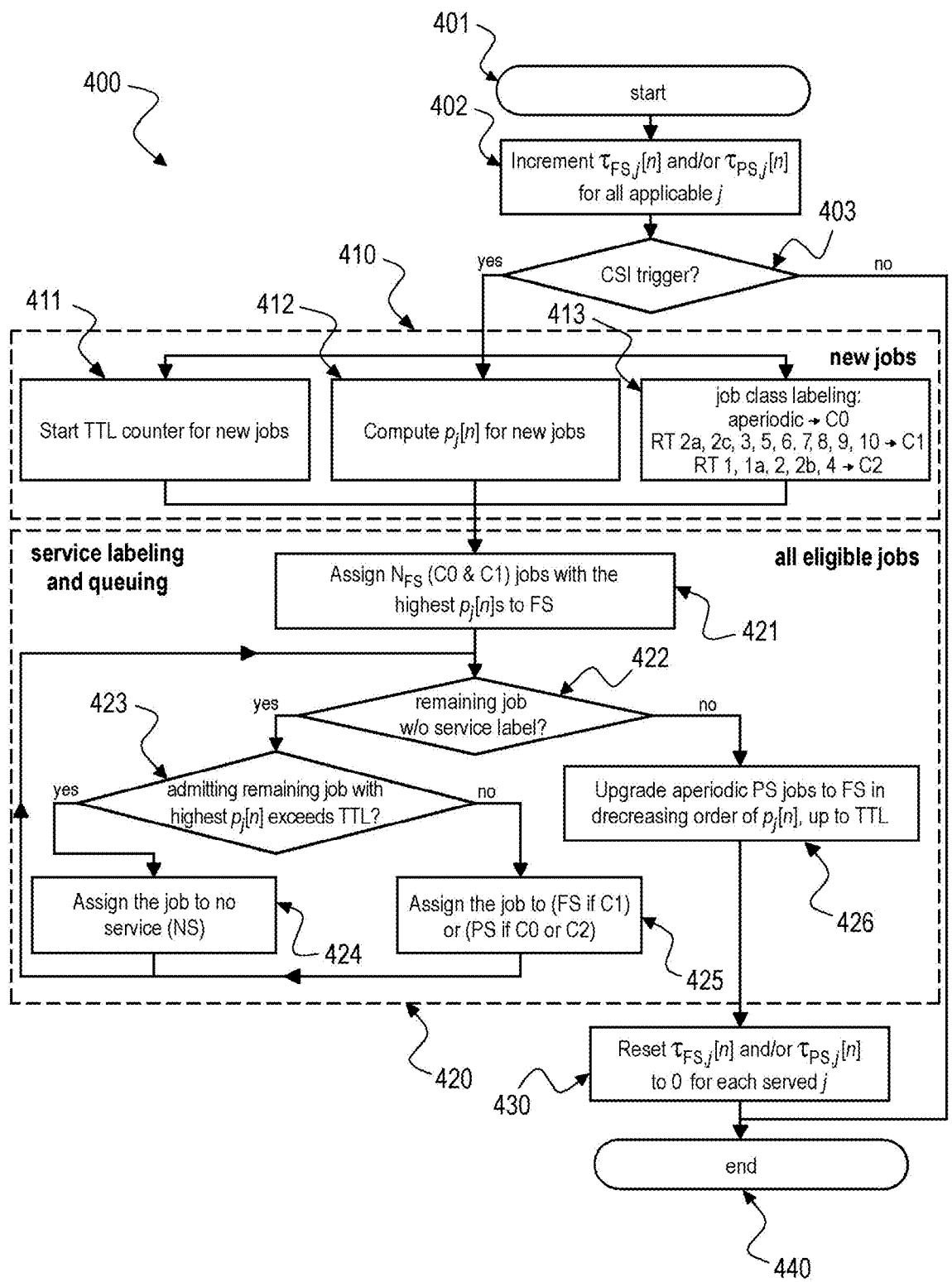
FIG. 4 is a flow diagram of an example CSI computation scheduling in LTE 400 according to an exemplary implementation.

FIG. 4 is a flow diagram of an example CSI computation scheduling in LTE 400 according to an exemplary implementation.

The flow diagram is a more specific example CSI computation scheduling that embodies the concept of this disclosure, in the context of an LTE Release-13 system. This flow consists of a wrapper function for updating time counters and detecting CSI measurement triggers, as well as the main scheduling functions of new job preparation, service labeling, and queuing that are adaptations of FIG. 3. One cycle of this flow is triggered every subframe in each connection, e.g. SIM, where one subframe is the minimum CSI reporting period in LTE. Such regular cycle period and wrapper function are necessary if the priority metric depends on the time since the last update. Adaptations of the main scheduling functions in this example include the addition of job index, priority metric handling, and job class adaptation.

In the context of LTE, a job is defined as a CSI measurement trigger associated with a SIM, a reporting mode (RM), a component carrier (CC), a CSI-process, and a CSI subframe set if configured. A job may contain long-term elements and/or short-term elements, where the long-term elements may include CRI (channel state information-reference signal resource indicator), RI (rank indication), and first PMI (precoding matrix indicator), and the short-term elements may include either PMI or second PMI as well as CQI (channel quality indicator). Thus each job index j uniquely identifies the CSI associated with a SIM, a CSI-process/CC, a CSI subframe set if configured, and a reporting mode. In other words, given a SIM index $i_{SIM}$, a cell index c, a CSI-process index $i_{CSI-P}$, a CSI subframe set index $C_{CSI}$, and a reporting mode RM, j is equivalent to $\{i_{SIM}, c, i_{CSI-P}, C_{CSI}, RM\}$.

An example priority metric $p_j[n]$ of j-th job at n-th subframe may be constructed as $$p_j[n]=\alpha_{FS}\cdot\tau_{FS,j}[n]+\alpha_{PS}\cdot\tau_{PS,j}[n],$$

where $\alpha_{FS}$ and $\alpha_{PS}$ denote full service weight and partial service weight, respectively, and $\tau_{FS,j}[n]$ and $\tau_{PS,j}[n]$ denote the age counters of j-th job at n-th subframe for full and partial service, respectively. The weights are such that $\alpha_{FS}<\alpha_{PS}$ to update short-term elements more often. The age counters reflect the time since the last update. They are incremented every subframe and are reset to zero when the associated CSI elements for the j-th job are updated. A full service for j-th job may be designed to compute all CSI elements included in any of the partial services for j-th job. In this case, resetting $\tau_{FS,j}[n]$ should trigger resetting $\tau_{PS,j}[n]$ as well. Numerous variations on the priority metric can be made, but herein the above example is used to succinctly illustrate the key points.

As the figure shows, a CSI computation scheduling method 400 in LTE may comprise the following steps after start 401:
1. Age counters update 402: For all applicable j. An applicable j corresponds to a $\{i_{SIM}, c, i_{CSI-P}, C_{CIS}, RM\}$ whose associated CSI report can be validly configured for the UE.
    a. For all non-applicable j, $\tau_{FS,j}=\tau_{PS,j}=0$, i.e. no update.
    b. If there are no long-term elements (CRI, RI, first PMI) associated with j, $\tau_{PS,j}[n]=\tau_{PS,j}[n-1]+1$. That is, $\tau_{FS,j}=0$.
    c. Otherwise, $\tau_{FS,j}[n]=\tau_{FS,j}[n-1]+1$ and $\tau_{PS,j}[n]=\tau_{PS,j}[n-1]+1$.
2. CSI measurement trigger check 403: If there is a new set of CSI measurement triggers, proceed to Step 3. Otherwise, proceed to Step 6.
3. New job preparation 410: For all new jobs, perform the following in any order.
    a. Start TTL counter 411.
    b. Compute 412 the priority metrics $p_j[n]$.
    c. Label 413 the job class.

i. If the job corresponds to an aperiodic RM, its class is C0.
ii. If the job corresponds to a periodic RM and the RT (reporting type) is 2a, 2c, 3, 5, 6, 7, 8, 9, or 10, its class is C1.
iii. If the job corresponds to a periodic RM and the RT is 1, 1a, 2, 2b, or 4, its class is C2.
4. Service labeling and queueing 420: For all eligible jobs, do the following in the prescribed order.
   a. Assign 421 FS label to $N_{FS}$ (C0 and C1 class) jobs with the highest $p_j[n]$s. Admit them to the queue. The parameter $N_{FS}$ is UE controllable and $\geq 1$.
   b. While there is a remaining eligible job 422 without service label:
      i. If admitting 423 the remaining job with the highest $p_j[n]$ would exceed the TTL of the job, assign 424 NS label to the job. For this purpose, its minimum job size is used, i.e. FS size if C1 and PS size if C0 or C2.
      ii. Else, assign 425 FS label to the job if it is C1 class, or assign PS label to the job if it is C0 or C2 class. Admit it to the queue.
   c. Sequentially reassign 426 the service label of the queued C0 jobs with PS label to FS label, in the decreasing order of $p_j[n]$, until (there is no more C0 job with PS label) or (the point when reassigning the next C0 job with PS label to FS label would cause a queued job to exceed its TTL), whichever comes earlier.
5. Age counters reset 430: For all js that are served.
   a. If the service was FS: $\tau_{FS,j}[n]=0$ and $\tau_{PS,j}[n]=0$.
   b. If the service was PS: $\tau_{PS,j[n]}=0$.
6. End 440.

In the flow, whenever more than one jobs have the same $p_j[n]$ and compete for limited spots in a scheduling action, the jobs may be selected according to a criterion, e.g. in the increasing order of j.

The job sizes may depend on the UE HW capability, bandwidth, number of transmit & receive antenna ports, data transmission scheme, RM, service label {FS, PS} if aperiodic, RT if periodic, and other configurations. The sizes may be predetermined and stored in a memory.

The queue size is assumed to support at least $N_{FS}$ full service and at least $(N_{max}^{CSIupdate}-N_{FS})$ partial service, where $N_{max}^{CSIupdate} \geq 5$ and $N_{max}^{CSIupdate} \geq N_{FS}$. The queue may correspond to the queue 210 depicted in FIG. 2.

Figure 5:
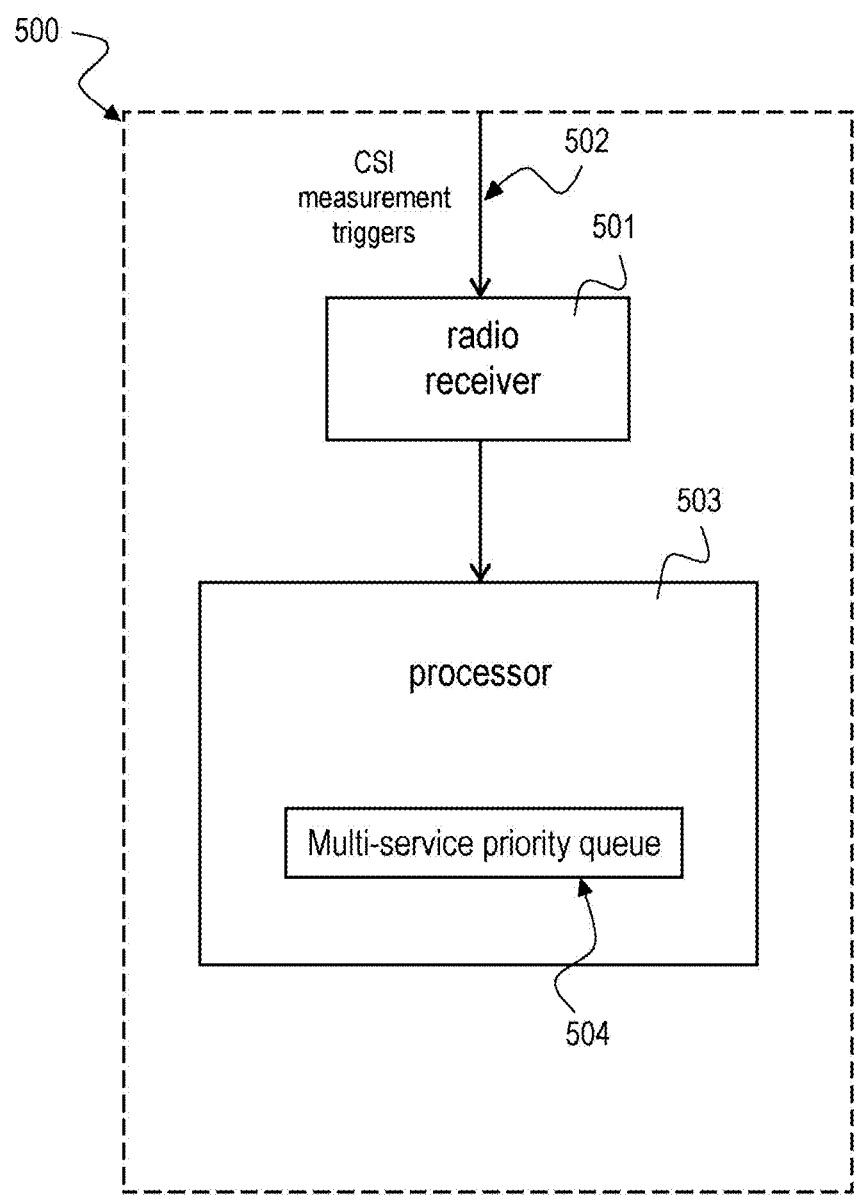
FIG. 5 is a block diagram of a mobile communication device circuitry 500 with a multi-service priority queue 504 according to an exemplary implementation.

FIG. 5 is a block diagram of a mobile communication device circuitry 500 with a multi-service priority queue 504 according to an exemplary implementation. The mobile communication device circuitry 500 includes a radio receiver 501 and a processor 503 including a multi-service priority queue, e.g. a multi-service priority queue 210 as described above with respect to FIG. 2. The radio receiver 501 is configured to receive a plurality of channel state information (CSI) measurement requests 502, each CSI measurement request triggering a CSI measurement, e.g. as described above with respect to FIG. 1. The processor 503 is configured to process the plurality of CSI measurement triggers within a CSI reporting period according to a CSI computation scheduling which is based on a multi-service priority queue of multi-size jobs, each job corresponding to a respective CSI measurement trigger. The CSI computation scheduling may correspond to the CSI computation scheduling 300 described above with respect to FIG. 3 or to the CSI computation scheduling 400 described above with respect to FIG. 4.

Each CSI measurement may include a set of CSI elements. Each CSI element may be classified according to an expected rate of time-variation of the respective CSI element.

The processor 503 may be configured to derive a service type of a plurality of service types from the classification of CSI elements, e.g. as described above with respect to FIGS. 3 and 4. The plurality of service types may include the following service types: full service, partial service, no service, e.g. as described above with respect to FIGS. 3 and 4.

The jobs may correspond to jobs from a plurality of subscriber identification modules (SIMs), e.g. as described above with respect to FIGS. 3 and 4. The CSI computation scheduling may be configured to allow a first set of jobs from a first SIM and a second set of jobs from a second SIM to coexist in the multi-service priority queue, e.g. as described above with respect to FIGS. 2 to 4. The processor 503 may be configured to provide each job with a limited time-to-live (TTL), e.g. as described above with respect to FIGS. 2 to 4. The processor 503 may be configured to update the TTL of each job on a time basis, e.g. as described above with respect to FIGS. 2 to 4. The processor 503 may be configured to queue the plurality of jobs 502 arriving at the radio receiver 501 within the multi-service priority queue 504. The processor 503 may be configured to re-sort all queued jobs in the multi-service priority queue with respect to a priority metric upon arrival of a set of new jobs, e.g. as described above with respect to FIGS. 2 to 4. The priority metric may be based on at least one or a combination of the following items: a time since a last update of a respective job, a radio channel coherence time, a time variation of recent updated CSI values, e.g. as described above with respect to FIGS. 2 to 4.

The processor 503 may be configured to allow a new job with a higher priority than the queued jobs to jump the queue, thereby reordering the queued jobs, e.g. as described above with respect to FIGS. 2 to 4. The processor 503 may be configured to discard at least one job from the queue based on at least one of the following conditions: a priority of the at least one job is below a threshold, a position of the at least one job within the queued jobs is beyond the queue size, the expected time to serve the at least one job has become greater than the remaining TTL of the job, e.g. as described above with respect to FIGS. 2 to 4. For the case that no job satisfies the discarding conditions, no job is discarded.

Figure 6:
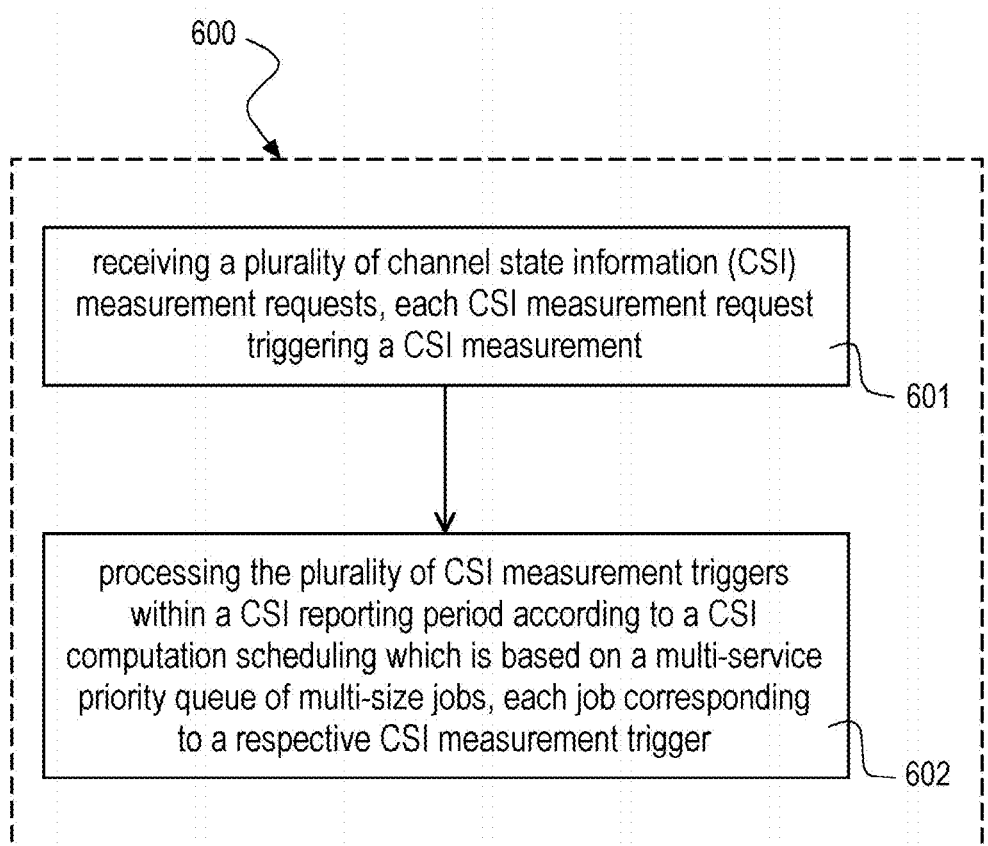
FIG. 6 is a schematic diagram of a method 600 for processing a plurality of CSI triggers based on a multi-service priority queue according to an exemplary implementation.

FIG. 6 is a schematic diagram of a method 600 for processing a plurality of CSI triggers based on a multi-service priority queue according to an exemplary implementation.

The method 600 includes receiving 601 a plurality of channel state information (CSI) measurement requests, each CSI measurement request triggering a CSI measurement; and processing 602 the plurality of CSI measurement triggers within a CSI reporting period according to a CSI computation scheduling which is based on a multi-service priority queue of multi-size jobs, each job corresponding to a respective CSI measurement trigger.

Each CSI measurement may include a set of CSI elements. Each CSI element may be classified according to an expected rate of time-variation of the respective CSI element.

The method 600 may further include: deriving a service type of a plurality of service types from the classification of CSI elements. The plurality of service types may include the following service types: full service, partial service, no service. The jobs may correspond to jobs from a plurality of subscriber identification modules (SIMs), e.g. as described above with respect to FIGS. 3 and 4.

The CSI computation scheduling may be configured to allow a first set of jobs from a first SIM and a second set of jobs from a second SIM to coexist in the multi-service priority queue, e.g. as described above with respect to FIGS. 2 to 4.

The method 600 may further include: providing each job with a limited time-to-live (TTL). The method 600 may further include: updating the TTL of each job on a time basis, e.g. as described above with respect to FIGS. 2 to 4. The method 600 may further include: queueing the plurality of incoming jobs within the multi-service priority queue, e.g. as described above with respect to FIGS. 2 to 4. The method 600 may further include: re-sorting all queued jobs in the multi-service priority queue with respect to a priority metric upon arrival of a set of new jobs, e.g. as described above with respect to FIGS. 2 to 4.

The priority metric may be based on at least one or a combination of the following items: a time since a last update of a respective job, a radio channel coherence time, a time variation of recent updated CSI values, e.g. as described above with respect to FIGS. 2 to 4.

The method 600 may further include: allowing a new job with a higher priority than the queued jobs to jump the queue, thereby reordering the queued jobs, e.g. as described above with respect to FIGS. 2 to 4.

The method 600 may further include: discarding at least one job from the queue based on at least one of the following conditions: a priority of the at least one job is below a threshold, a position of the at least one job within the queued jobs is beyond the queue size, the expected time to serve the at least one job has become greater than the remaining TTL of the job, e.g. as described above with respect to FIGS. 2 to 4.

The method 600 may further include the functionality of the devices described above with respect to FIGS. 2 to 5. The method 600 may be implemented with a mobile device, in particular a mobile communication device 500 as described above with respect to FIG. 5.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 600 or the techniques described above with respect to FIGS. 2 to 5. Such a computer program product may include a computer-readable non-transitory storage medium storing program code thereon for use by a processor, the program code comprising instructions for performing any of the method 600 or the techniques as described above.

Examples

The following examples pertain to further embodiments. Example 1 is a mobile communication device circuitry, comprising: a radio receiver configured to receive a plurality of channel state information (CSI) measurement requests, each CSI measurement request triggering a CSI measurement; and a processor configured to process the plurality of CSI measurement trigger within a CSI reporting period according to a CSI computation scheduling which is based on a multi-service priority queue of multi-size jobs, each job corresponding to a respective CSI measurement trigger.

In Example 2, the subject matter of Example 1 can optionally include that each CSI measurement comprises a set of CSI elements, and that each CSI element is classified according to an expected rate of time-variation of the respective CSI element.

In Example 3, the subject matter of Example 2 can optionally include that the processor is configured to derive a service type of a plurality of service types from the classification of CSI elements.

In Example 4, the subject matter of Example 3 can optionally include that the plurality of service types comprises the following service types: full service where all CSI elements are updated, partial service where a subset of CSI elements are updated, no service where the CSI elements are not updated.

In Example 5, the subject matter of any one of Examples 1-4 can optionally include that each job is associated with a distinct size, corresponding to a time needed by the mobile communication device circuitry to compute the job.

In Example 6, the subject matter of any one of Examples 1-5 can optionally include that the jobs correspond to jobs from a plurality of subscriber identification modules (SIMS).

In Example 7, the subject matter of Example 6 can optionally include that the CSI computation scheduling is configured to allow a first set of jobs from a first SIM of the plurality of SIMs and a second set of jobs from a second SIM of the plurality of SIMs to coexist in the multi-service priority queue.

In Example 8, the subject matter of Example 7 can optionally include that the multi-service priority queue comprises a number of single priority queues which is smaller than a number of SIMs.

In Example 9, the subject matter of any one of Examples 1-8 can optionally include that the processor is configured to provide each job with a limited time-to-live (TTL).

In Example 10, the subject matter of Example 9 can optionally include that the processor is configured to update the TTL of each job on a time basis.

In Example 11, the subject matter of Example 10 can optionally include that the processor is configured to queue the plurality of jobs arriving at the radio receiver within the multi-service priority queue.

In Example 12, the subject matter of Example 11 can optionally include that the processor is configured to re-sort all queued jobs in the multi-service priority queue with respect to a priority metric upon arrival of a set of new jobs.

In Example 13, the subject matter of Example 12 can optionally include that the priority metric is based on at least one or a combination of the following items: a time since a last update of a respective job, a radio channel coherence time, a time variation of recent updated CSI values.

In Example 14, the subject matter of Example 12 can optionally include that the processor is configured to allow a new job with a higher priority than the queued jobs to jump the queue, thereby reordering the queued jobs.

In Example 15, the subject matter of any one of Examples 10-14 can optionally include that the processor is configured to discard at least one job from the queue based on at least one of the following conditions: a priority of the at least one job is below a threshold, a position of the at least one job within the queued jobs is beyond the queue size, the expected time to serve the at least one job has become greater than the remaining TTL of the job.

Example 16 is a method for processing a plurality of channel state information (CSI) measurement triggers, the method comprising: receiving a plurality of channel state information (CSI) measurement requests, each CSI measurement trigger request triggering a CSI measurement; and processing the plurality of CSI measurement triggers within a CSI reporting period according to a CSI computation scheduling which is based on a multi-service priority queue of multi-size jobs, each job corresponding to a respective CSI measurement trigger.

In Example 17, the subject matter of Example 16 can optionally include that each CSI measurement comprises a set of CSI elements, and that each CSI element is classified according to an expected rate of time-variation of the respective CSI element.

In Example 18, the subject matter of Example 17 can optionally include: deriving a service type of a plurality of service types from the classification of CSI elements.

In Example 19, the subject matter of Example 18 can optionally include that the plurality of service types comprises the following service types: full service, partial service, no service.

In Example 20, the subject matter of any one of Examples 16-19 can optionally include that the jobs correspond to jobs from a plurality of subscriber identification modules (SIMS).

In Example 21, the subject matter of Example 20 can optionally include that the CSI computation scheduling is configured to allow a first set of jobs from a first SIM and a second set of jobs from a second SIM to coexist in the multi-service priority queue.

In Example 22, the subject matter of any one of Examples 16-21 can optionally include: providing each job with a limited time-to-live (TTL).

In Example 23, the subject matter of Example 22 can optionally include: updating the TTL of each job on a time basis.

In Example 24, the subject matter of Example 23 can optionally include: queueing the plurality of incoming jobs within the multi-service priority queue.

In Example 25, the subject matter of Example 24 can optionally include: re-sorting all queued jobs in the multi-service priority queue with respect to a priority metric upon arrival of a set of new jobs.

In Example 26, the subject matter of Example 25 can optionally include that the priority metric is based on at least one or a combination of the following items: a time since a last update of a respective job, a radio channel coherence time, a time variation of recent updated CSI values.

In Example 27, the subject matter of any one of Examples 25-26 can optionally include: allowing a new job with a higher priority than the queued jobs to jump the queue, thereby reordering the queued jobs.

In Example 28, the subject matter of any one of Examples 23-27 can optionally include: discarding at least one job from the queue based on at least one of the following conditions: a priority of the at least one job is below a threshold, a position of the at least one job within the queued jobs is beyond the queue size, the expected time to serve the at least one job has become greater than the remaining TTL of the job.

Example 29 is a method for scheduling computation of channel state information (CSI) based on a multi-service priority queue, the method comprising: receiving a new set of jobs, each job corresponding to a respective CSI measurement trigger; starting a Time-To-Live (TTL) counter for the jobs from the new set of jobs; obtaining a priority for each job from the new set of jobs; labeling each job from the new set of jobs with a job class from a set of job classes; queueing the new set of jobs to the multi-service priority queue; labeling each job from the queued jobs with a service type from a set of service types based on the priority and the job class of the respective job; and processing the queued jobs based on their service types.

In Example 30, the subject matter of Example 27 can optionally include: reassigning the service type labeling of the queued jobs based on their priority.

In Example 31, the subject matter of any one of Examples 29-30 can optionally include: updating the TTL counters of the queued jobs.

In Example 32, the subject matter of any one of Examples 29-31 can optionally include: discarding a job of the queued jobs from the queue based on the job's TTL counter and priority and based on a size of the multi-service priority queue.

In Example 33, the subject matter of any one of Examples 29-32 can optionally include that the set of service types comprises the following service types: full service, partial service, and no service.

In Example 34, the subject matter of Example 33 can optionally include that the set of job classes comprise the following job classes: a first job class (C0) labeled for jobs amenable to all service types, a second job class (C1) amenable to services of full service type and services of no service type, a third job class (C2) amenable to services of partial service type and no service type.

In Example 35, the subject matter of any one of Examples 29-34 can optionally include that processing the queued jobs comprises: computing for a queued job a subset of CSI elements of a CSI measurement corresponding to the queued job.

Example 36 is a device for processing a plurality of channel state information (CSI) measurement triggers, the device comprising: means for receiving a plurality of channel state information (CSI) measurement requests, each CSI measurement request triggering a CSI measurement; and means for processing the plurality of CSI measurement triggers within a CSI reporting period according to a CSI computation scheduling which is based on a multi-service priority queue of multi-size jobs, each job corresponding to a respective CSI measurement trigger.

In Example 37, the subject matter of Example 36 can optionally include means for providing each job with a limited time-to-live (TTL).

In Example 38, the subject matter of Example 37 can optionally include means for updating the TTL of each job on a time basis.

Example 39 is a multiple-input multiple-output (MIMO) communication system, comprising a plurality of transmitters and a mobile communication device, wherein each transmitter is configured to transmit a respective channel state information (CSI) measurement request to the mobile communication device in order to trigger the mobile communication device for a corresponding CSI measurement, wherein the mobile communication device is configured to process the plurality of CSI measurement triggers within a CSI reporting period according to a CSI computation scheduling which is based on a multi-service priority queue of multi-size jobs, each job corresponding to a respective CSI measurement trigger.

In Example 40, the subject matter of Example 39 can optionally include that each CSI measurement comprises a set of CSI elements, and that each CSI element is classified according to an expected rate of time-variation of the respective CSI element.

Example 41 is a computer readable non-transitory medium on which computer instructions are stored which when executed by a computer cause the computer to perform the method of any one of Examples 16 to 35.

Example 42 is an apparatus or a method for scheduling more than one channel state information (CSI) to be computed at a receiver in a radio communication network, comprising: determining a priority metric for each new CSI measurement triggered; associating each new CSI measurement triggered with a job class, from a set of more than one job classes; assigning a full service (FS) association to a nonzero subset of eligible jobs in a subset of job classes in the decreasing order of priority, where the eligible jobs include all new CSI measurements triggered and a subset of the CSI measurements already scheduled but not computed yet; assigning a service association, the set of which includes FS and a partial service (PS), to each remaining eligible job without service association, in the decreasing order of priority, as long as the said assignment does not exceed a time-to-live (TTL) for the CSI measurement trigger, where the TTL is the remaining time the receiver has for determining the triggered CSI; computing all CSI elements of each CSI measurement trigger associated with full service; and computing a subset of CSI elements of each CSI measurement trigger associated with partial service.

In Example 43, the subject matter of Example 42 can optionally include that the priority metric is based on the time since the last update of the associated CSI, channel parameters such as coherence time, and/or time-variation of recently updated CSI values.

In Example 44, the subject matter of any one of Examples 42-43 can optionally include that the job classes are based on the expected rate of time-variation of each CSI element.

In Example 45, the subject matter of Example 44 can optionally include that a subset of the CSI elements are classified as fast-varying (short-term).

In Example 46, the subject matter of Example 45 can optionally include that the computed subset of CSI elements of a CSI measurement trigger associated with PS comprises all short-term elements.

In Example 47, the subject matter of any one of Examples 42-46 can optionally include that a job without a service association at the end of scheduling is assigned a no service (NS) association, and the CSI elements of the job are not computed.

In Example 48, the subject matter of any one of Examples 42-47 can optionally include that the value of a CSI element not computed is determined by either copying from one or more previous estimates if available, or by selecting a predetermined or random value if such history is not available.

In Example 49, the subject matter of any one of Examples 45-46 can optionally include that a first class of jobs can be associated with FS or PS or NS, a second class of jobs can be associated with FS or NS, and a third class of jobs can be associated with PS or NS.

In Example 50, the subject matter of Example 49 can optionally include that the first subset of job classes eligible for FS association include the first class and the second class, and the second subset of job classes eligible for PS association include the first class and the third class.

In Example 51, the subject matter of any one of Examples 42-50 can optionally include that, after all service association is done, each job with PS association has its association changed to FS, in the decreasing order of priority, until when the said change for a job would cause the CSI computation of the job to exceed its TTL.

In Example 52, the subject matter of any one of Examples 42-47 can optionally include that the computation is done in the order of service assignment.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A mobile communication device circuitry, comprising:
a radio receiver configured to receive a plurality of channel state information (CSI) measurement requests, each CSI measurement request triggering a CSI measurement comprising a set of CSI elements; and
a processor configured to:
classify each CSI element according to an expected rate of time-variation of the respective CSI element; and
process the plurality of CSI measurement request within a CSI reporting period according to a CSI computation scheduling which is based on a multi-service priority queue of multi-size jobs, each job corresponding to a respective CSI measurement request.

2. The mobile communication device circuitry of claim 1, wherein the processor is configured to derive a service type of a plurality of service types from the classification of CSI elements.

3. The mobile communication device circuitry of claim 2, wherein the plurality of service types comprises the following service types:
full service (FS), where all CSI elements of the set of CSI elements are updated,
partial service (PS), where a subset of the set of CSI elements are updated, and no service (NS), where the set of CSI elements is not updated.

4. The mobile communication device circuitry of claim 1, wherein each job is associated with a distinct size, corresponding to a time needed by the mobile communication device circuitry to compute the respective job.

5. The mobile communication device circuitry of claim 1, wherein the jobs correspond to jobs from a plurality of subscriber identification modules (SIMs).

6. The mobile communication device circuitry of claim 5, wherein the CSI computation scheduling is configured to allow a first set of jobs from a first SIM of the plurality of SIMs and a second set of jobs from a second SIM of the plurality of SIMs to coexist in the multi-service priority queue.

7. The mobile communication device circuitry of claim 6, wherein the multi-service priority queue comprises a number of single priority queues which is smaller than a number of SIMs.

8. The mobile communication device circuitry of claim 1, wherein the processor is configured to provide each job with a limited time-to-live (TTL).

9. The mobile communication device circuitry of claim 8, wherein the processor is configured to update the TTL of each job on a time basis.

10. The mobile communication device circuitry of claim 9, wherein the processor is configured to queue the multi-size jobs arriving at the radio receiver within the multi-service priority queue.

11. The mobile communication device circuitry of claim 10, wherein the processor is configured to re-sort all queued jobs in the multi-service priority queue with respect to a priority metric upon arrival of a set of new jobs.

12. The mobile communication device circuitry of claim 11,
wherein the priority metric is based on at least one or a combination of the following items:
a time since a last update of a respective job,
a radio channel coherence time, and
a time variation of recent updated CSI values.

13. The mobile communication device circuitry of claim 11, wherein the processor is configured to allow a new job with a higher priority than the queued jobs to jump the queue, thereby reordering the queued jobs.

14. The mobile communication device circuitry of claim 9, wherein the processor is configured to discard at least one job from the queue based on at least one of the following conditions:
a priority of the at least one job is below a threshold,
a position of the at least one job within the queued jobs is beyond a queue size, and
an expected time to serve the at least one job has become greater than a remaining TTL of the at least one job.

15. A method for processing a plurality of channel state information (CSI) measurement requests, the method comprising:
receiving the plurality of CSI measurement requests, each CSI measurement request triggering a CSI measurement including a set of CSI elements, wherein each CSI element is classified according to an expected rate of time-variation of the respective CSI element; and
processing the plurality of CSI measurement requests within a CSI reporting period according to a CSI computation scheduling which is based on a multi-service priority queue of multi-size jobs, each job corresponding to a respective CSI measurement request.

16. The method of claim 15, comprising: deriving a service type of a plurality of service types from the classification of CSI elements.

17. The method of claim 16, wherein the plurality of service types comprises the following service types:
full service (FS),
partial service (PS), and
no service (NS).

18. The method of one of claim 15, wherein the jobs correspond to jobs from a plurality of subscriber identification modules (SIMs).

19. A mobile communication device circuitry, comprising:
a radio receiver configured to receive a plurality of channel state information (CSI) measurement requests, each CSI measurement request triggering a CSI measurement; and
a processor configured to process the plurality of CSI measurement request within a CSI reporting period according to a CSI computation scheduling which is based on a multi-service priority queue of multi-size jobs, each job corresponding to a respective CSI measurement request, wherein the jobs correspond to jobs from a plurality of subscriber identification modules (SIMs), the CSI computation scheduling being configured to allow a first set of jobs from a first SIM of the plurality of SIMs and a second set of jobs from a second SIM of the plurality of SIMs to coexist in the multi-service priority queue.

20. A mobile communication device circuitry, comprising:
a radio receiver configured to receive a plurality of channel state information (CSI) measurement requests, each CSI measurement request triggering a CSI measurement comprising a set of CSI elements; and
a processor configured to:
classify each CSI element according to an acted rate of time-variation of the respective CSI element;
process the plurality of CSI measurement request within a CSI reporting period according to a CSI computation scheduling which is based on a multi-service priority queue of multi-size jobs, each job corresponding to a respective CSI measurement request;
provide each job with a limited time-to-live (TTL);
update the TTL of each job on a time basis; and
queue the multi-size jobs arriving at the radio receiver within the multi-service priority queue.

* * * * *